United States Patent
Elmaanaoui

(10) Patent No.: US 12,458,233 B2
(45) Date of Patent: Nov. 4, 2025

(54) OPTICAL SAFETY DEVICE

(71) Applicant: Canon U.S.A., Inc., Melville, NY (US)

(72) Inventor: Badr Elmaanaoui, Belmont, MA (US)

(73) Assignee: Canon U.S.A., Inc., Melville, NY (US)

( * ) Notice: Subject to any disclaimer, the term of this patent is extended or adjusted under 35 U.S.C. 154(b) by 304 days.

(21) Appl. No.: 18/159,004

(22) Filed: Jan. 24, 2023

(65) Prior Publication Data

US 2024/0245298 A1 Jul. 25, 2024

(51) Int. Cl.
*A61B 5/00* (2006.01)
*G01B 9/02* (2022.01)
(Continued)

(52) U.S. Cl.
CPC ........ *A61B 5/0066* (2013.01); *G01B 9/02004* (2013.01); *G01B 9/02052* (2013.01); *G01B 9/02091* (2013.01); *A61B 5/0084* (2013.01)

(58) Field of Classification Search
CPC .... A61B 17/07207; A61B 2017/00398; A61B 2017/00734; A61B 17/068; A61B 2017/0046; A61B 2017/00017; A61B 2017/07271; A61B 2017/2927; A61B 2017/07285; A61B 17/072; A61B 2017/00477; A61B 2017/07278; A61B 18/1445; A61B 2090/0814; A61B 17/32; A61B 2017/07257; A61B 2018/1455; A61B 2017/00115; A61B 17/105; A61B 2017/00199; A61B 2090/0811; A61B 2017/00367; A61B 2017/2923; A61B 2018/0063; A61B 2017/07214; A61B 2018/1412; A61B 2090/0808; A61B 2017/2946; A61B 2017/00464; A61B 2018/00404; A61B 34/30; A61B 2017/00221; A61B 90/98; A61B 2018/00601; A61B 2090/0803; A61B 2017/00473; A61B 2090/034; A61B 18/1492; A61B 17/07292; A61B 2017/00407; A61B 2017/00119; A61B 2018/00196; A61B 17/1155; A61B 2018/00577; A61B 2017/00022; A61B 17/0686; A61B 2017/00154; A61B 2090/0807; A61B 17/00234; A61B 17/29; A61B 2017/00123; A61B 2017/2945; A61B 18/1442; A61B 34/74; A61B 90/90; A61B 90/96; A61B 2017/07264; A61B 2018/0022; A61B 2017/07228;
(Continued)

(56) References Cited

U.S. PATENT DOCUMENTS 8,335,413 B2 * 12/2012 Dromaretsky ......... G02B 6/351
385/36
2010/0141954 A1 * 6/2010 Kobayashi ......... G01B 9/02087
356/479

FOREIGN PATENT DOCUMENTS

CN 104027073 A * 9/2014
CN 208769754 U * 4/2019 ........... A61B 3/0008
(Continued)

*Primary Examiner* — Michael P Stafira
(74) *Attorney, Agent, or Firm* — Canon U.S.A., Inc. IP Division

(57) ABSTRACT

An apparatus includes a wavelength swept light source to generate a measurement beam, a scanner to move the measurement beam on a sample, a measurement device to measure the sample, and a safety device to stop the light source based on sweeping status of the light source.

29 Claims, 11 Drawing Sheets

(51) Int. Cl.
  *G01B 9/02004* (2022.01)
  *G01B 9/02091* (2022.01)

(58) Field of Classification Search
  CPC .. A61B 2018/1861; A61B 2017/00084; A61B 2018/00494; A61B 2018/00619; A61B 2050/314; A61B 2017/00389; A61B 2017/00818; A61B 2017/2929; A61B 2090/0813; A61B 90/03; A61B 2018/00642; A61B 17/115; A61B 2018/00916; A61B 2017/00137; A61B 2018/1432; A61B 34/76; A61B 2018/00791; A61B 2018/00922; A61B 2090/037; A61B 2017/0023; A61B 2017/00482; A61B 2090/035; A61B 90/30; A61B 18/06; A61B 18/1482; A61B 2090/372; A61B 17/0644; A61B 2017/00393; A61B 2018/00839; A61B 2090/065; A61B 2017/00402; A61B 2017/294; A61B 2018/0212; A61B 18/085; A61B 2017/00486; A61B 2018/00875; A61B 2090/064; A61B 17/3472; A61B 2017/2901; A61B 2018/00029; A61B 2560/0214; A61B 34/25; A61B 2018/1452; A61B 17/064; A61B 17/28; A61B 17/32002; A61B 2017/0019; A61B 2090/0804; A61B 90/50; A61B 18/20; A61B 2017/0688; A61B 34/10; A61B 2017/00424; A61B 2017/2902; A61B 2017/291; A61B 2017/2941; A61B 2034/252; A61B 2034/256; A61B 17/3478; A61B 18/082; A61B 2017/00353; A61B 2017/00862; A61B 2018/00982; A61B 2218/002; A61B 90/11; A61B 90/37; A61B 1/3132; A61B 17/26; A61B 17/32053; A61B 18/00; A61B 2017/07235; A61B 2017/07242; A61B 2017/2916; A61B 2018/00202; A61B 2018/00678; A61B 2018/00958; A61B 2090/061; A61B 10/025; A61B 17/00491; A61B 17/1637; A61B 17/3476; A61B 2010/0258; A61B 2017/00039; A61B 2018/00732; A61B 2018/00744; A61B 2018/126; A61B 2018/1475; A61B 2034/254; A61B 18/1206; A61B 18/14; A61B 2018/00452; A61B 2090/049; A61B 50/30; A61B 17/0682; A61B 18/1815; A61B 18/203; A61B 2017/00132; A61B 2017/00269; A61B 2017/2943; A61B 2017/320052; A61B 2018/00285; A61B 2018/0047; A61B 18/1402; A61B 18/24; A61B 2018/00434; A61B 2018/046; A61B 2090/038; A61B 17/295; A61B 2017/003; A61B 2017/00526; A61B 2017/00725; A61B 2018/00863; A61B 2018/00946; A61B 17/0401; A61B 17/1628; A61B 17/3209; A61B 18/02; A61B 2017/00075; A61B 2017/00327; A61B 2017/306; A61B 2018/00005; A61B 2018/00011; A61B 2018/00017; A61B 2018/00255; A61B 2018/00291; A61B 2018/00476; A61B 2018/00702; A61B 2018/044; A61B 2018/1253; A61B 2018/1467; A61B 2090/3933; A61B 2090/395; A61B 5/4836; A61B 5/6852; A61B 17/1622; A61B 17/1624; A61B 2017/00769; A61B 2017/0649; A61B 2018/00083; A61B 2018/0016; A61B 2018/00458; A61B 2018/00559; A61B 2018/00672; A61B 17/0218; A61B 17/2812; A61B 17/3201; A61B 2017/00004; A61B 2017/00371; A61B 2017/00867; A61B 2017/0725; A61B 2017/2933; A61B 2018/00041; A61B 2018/00809; A61B 2018/00815; A61B 2018/00821; A61B 2018/20351; A61B 2050/3014; A61B 2090/036; A61B 2090/3908; A61B 2505/05; A61B 2560/0431; A61B 2562/227; A61B 5/0036; A61B 5/0066; A61B 5/0084; A61B 5/055; A61B 5/4255; A61B 5/6885; A61B 17/285; A61B 2017/2825; A61B 2017/2903; A61B 2017/3492; A61B 2018/00607; A61B 2018/00988; A61B 2018/00994; A61B 17/2909; A61B 18/1447; A61B 18/1477; A61B 2017/0053; A61B 2017/2936; A61B 2017/3407; A61B 2018/00648; A61B 2018/00708; A61B 2018/00779; A61B 2018/00797; A61B 2090/0801; A61B 2090/081; A61B 17/1114; A61B 2017/00212; A61B 2017/00685; A61B 2017/00738; A61B 2017/0409; A61B 2017/2948; A61B 2018/0041; A61B 2018/00595; A61B 2034/2048; A61B 2090/08021; A61B 1/0005; A61B 17/320092; A61B 17/3205; A61B 17/3211; A61B 17/3494; A61B 18/1233; A61B 18/16; A61B 2017/00318; A61B 2017/0464; A61B 2017/2925; A61B 2017/320094; A61B 2017/320095; A61B 2018/00023; A61B 2562/0247; A61B 5/0077; A61B 5/01; A61B 5/1444; A61B 5/15003; A61B 5/150236; A61B 5/150274; A61B 5/150389; A61B 5/150496; A61B 5/150572; A61B 5/150641; A61B 5/150656; A61B 5/150725; A61B 5/150732; A61B 5/150809; A61B 5/150816; A61B 5/150916; A61B 5/153; A61B 5/154; A61B 5/155; A61B 1/00186; A61B 1/043; A61B 1/046; A61B 1/063; A61B 1/0638; A61B 18/04; A61B 2017/00181; A61B 2017/00438; A61B 2017/00902; A61B 2017/2912; A61B 2017/320097; A61B 90/70; A61B 90/94; A61B 17/06066; A61B 2017/00637; A61B 2017/00668; A61B 2017/0404; A61B 2017/0472; A61B 2017/0645; A61B 2017/081; A61B 2017/22082; A61B 2017/308; A61B 2018/00035; A61B 2018/00148; A61B 2018/00464; A61B 2018/0066; A61B 2018/00904; A61B 2018/1407; A61B 2018/1472; A61B 2018/162; A61B 2090/031; A61B 2217/007; A61B 5/0053; A61B 5/303; A61B 5/366; A61B 6/032; A61B 6/4241; A61B 6/4266; A61B 1/00002; A61B 1/00066; A61B 1/00117; A61B 17/0485; A61B 17/12045; A61B 17/2202; A61B 18/12; A61B 18/18; A61B 2017/00362; A61B 2017/00446; A61B 2017/0448; A61B 2017/0648; A61B 2017/1205; A61B 2017/1225; A61B 2017/3454; A61B 2018/0025; A61B 2018/00583; A61B 2018/0237; A61B 2018/0262; A61B 2018/141; A61B 2018/202; A61B 2034/2068; A61B 2034/741; A61B 2090/363; A61B 2090/365; A61B 2090/376; A61B 2090/3762; A61B 2090/3925; A61B 2090/3954; A61B 2090/3983; A61B 2090/5025; A61B 2505/01; A61B 2560/0462; A61B 2562/08; A61B 3/18; A61B 46/00; A61B 5/0002; A61B 5/1071; A61B 5/14532; A61B 5/318; A61B 5/41; A61B 5/6816; A61B 5/6838; A61B 5/6891; A61B 6/10; A61B 6/102; A61B 6/508; A61B 6/541; A61B 90/14; A61B 90/16; A61B 5/14552; A61B 90/361; A61B 3/102; A61B 2017/00973; A61B 2018/00589; A61B 3/14; A61B 18/201; A61B 2018/00321; A61B 2218/007; A61B 3/107; A61B 18/22; A61B 5/742; A61B 18/0206; A61B 18/148; A61B 18/28; A61B 2017/00911; A61B 2018/00446; A61B 2018/0293; A61B 2018/1807; A61B 2018/2211; A61B 2018/2261; A61B 2034/107; A61B 2034/301; A61B 2090/374; A61B 34/20; A61B 34/71; A61B 5/015; A61B 5/4839; A61B 5/702; A61B 5/746; A61B 90/10; A61B 1/00; A61B 3/1025; A61B 5/0071; A61B 5/026; A61B 5/14553; A61B 3/0008; A61B 5/0059; A61B 1/12; A61B 18/0218; A61B 2017/00057; A61B 2017/00061; A61B 2017/00747; A61B 2017/00756; A61B 2017/00761; A61B 2018/0231; A61B 2218/005; A61B 2560/0242; A61B 5/6814; A61B 1/00009; A61B 1/06; A61B 1/227; A61B 17/320016; A61B 17/3203; A61B 17/32075; A61B 2017/00247; A61B 2017/2905; A61B 2017/32007; A61B 2018/00392; A61B 5/0051; A61B 5/0531; A61B 5/123; A61B 5/14551; A61B 5/413; A61B 5/4312; A61B 5/4848; A61B 5/7475; A61B 1/00174; G01B 11/161; G01B 11/30; G01B 11/303; G01B 9/0209; G01B 9/02004; G01B 9/02052; G01B 9/02069; G01B 9/02091

See application file for complete search history.

(56) References Cited

FOREIGN PATENT DOCUMENTS

| | | | | |
|---|---|---|---|---|
| CN | 110198692 A | * | 9/2019 | ......... A61F 9/00825 |
| CN | 115279314 A | * | 11/2022 | ............ A61B 18/00 |
| JP | 2014103336 A | * | 6/2014 | |
| JP | 2015513110 A | * | 4/2015 | |
| JP | 6039493 B2 | * | 12/2016 | ......... G01B 9/02004 |
| JP | 7123628 B2 | * | 8/2022 | |
| WO | WO-2016033192 A1 | * | 3/2016 | ........... G01B 11/161 |
| WO | WO-2021263159 A1 | * | 12/2021 | ............ H04N 23/55 |

* cited by examiner

OPTICAL SAFETY DEVICE

BACKGROUND

Field of the Disclosure

The present disclosure generally relates to intravascular imaging and, more particularly, to an optical safety device.

Description of the Related Art

Intravascular imaging can detect, characterize, and visualize imaging data including coronary arteries, tissue regions, lumens of blood vessels, organs of the body, and other anatomical areas. Optical coherence tomography (OCT) provides high-definition three-dimensional optical imaging and cross-sectional images of tissue microstructure with contrast based on the changes in the optical properties (refractive index) of the tissue. OCT can guide procedure planning and treatment in percutaneous coronary intervention (PCI) and other procedures. OCT applications take place in cardiology, ophthalmology, dermatology, oncology, gastroenterology, urology, and other areas.

Intravascular OCT (IVOCT) imaging provides high contrast and high resolution imaging of the vasculature. IVOCT finds use with PCIs to provide the location, circumferential extent, and thickness of calcium, and can identify coronary fibrous, lipid, calcium, macrophage, and other types of depositions. IVOCT has been shown to differentiate lipid, calcium, and fibrous tissue of atherosclerotic plaques which is important for interventional cardiologists to determine course of action. However, OCT light penetration is limited and many a time not sufficient to determine extent of the lipid pool in atherosclerotic plaques due to the high attenuation coefficient of lipid for the typical wavelength used for IVOCT, typically in the range of 1260 nm to 1360 nm. One way to increase penetration is through increasing incident power on the tissue.

Increasing optical power poses optical hazards that need to be mitigated especially for shorter wavelength. The Accessible Emission Level (AEL) for wavelengths greater than or equal to 1310 nm is 500 mW, whereas this level decreases rapidly as wavelength gets shorter (see FIG. 4).

It would therefore be advantageous to image at wavelengths greater than 1310 nm. However most optical components, fiber, and laser sources are optimized to operate at about 1310 nm with a typical bandwidth of 100 nm. For swept source OCT (SS-OCT) the laser rapidly scans a narrow line width throughout the laser spectrum output from for example 1240 nm to 1380 nm. However, a reasonably foreseeable single-fault condition for these lasers could involve the control circuit of a scanning mechanism and can cause the laser output to be stuck at any of the possible wavelengths, like 1240 nm for example. A laser with optical power that is about 100 mW will start to exceed the Class 1 classification.

A need exists and it would be beneficial and advantageous to determine when this failure occurs and mitigate against it.

SUMMARY

The present disclosure advantageously provides solutions to problems of laser scan stop at a short wavelength causing an increase in laser classification and ocular hazard to the user and patient.

An apparatus according to some embodiments includes a wavelength swept light source to generate a measurement beam, a scanner to move the measurement beam on a sample, a measurement device to measure the sample, and a safety device to stop the light source based on sweeping status of the light source.

The safety device can monitor the light source and determine the sweeping status of the light source with the safety device, wherein the light source sweeps at a predetermined frequency (wavelength sweep rate) within a predetermined wavelength range.

The safety device can stop the light source when the safety device determines the light source is sweeping at a wavelength sweep rate different from the predetermined frequency, is not sweeping in the predetermined wavelength range, or is sweeping at a wavelength outside of the predetermined wavelength range.

The safety device can include an interlock, and the safety device can cause the interlock to trip and optical power stays below a predetermined classification limit. The interlock can turn off or block the light source. The light source can be a laser.

The safety device can include a k-clock and a comparator to make a comparison in a voltage regime or a frequency regime.

The safety device can include a tap monitor, a fiber Bragg grating, and a comparator to make a comparison in a voltage regime or a frequency regime. The safety device can include a tap monitor and an optical filter and a comparator to make a comparison in a voltage regime or a frequency regime.

The apparatus can be an OCT apparatus that performs imaging based on wavelength sweeping and measurement light scanning. The imaging can be performed by splitting light emitted from the light source into measurement light and reference light, superposing the return light of the measurement light returned from the sample with the reference light to generate interference light, detecting data of the interference light with a detector, and processing the detected data acquired according to the wavelength sweeping and the measurement light scanning.

The OCT apparatus can include a reference arm, a sample arm, a beam splitter, a reference mirror, a detector, a PIU, a probe, a computer, a display, or combinations thereof.

The PIU can provide functions including imaging core rotation, imaging core translation, optical probe engage/unlock, user interface, or combinations thereof. The probe can include an optical probe and be a catheter or an endoscope.

A method for an apparatus according to some embodiments includes generating a measurement beam with a wavelength swept light source, scanning a sample by moving the measurement beam on the sample, measuring the sample with a measurement device, and causing a safety device to stop the light source based on sweeping status of the light source.

The method can monitor the light source and determine the sweeping status of the light source with the safety device, wherein the light source sweeps at a predetermined frequency (wavelength sweep rate) within a predetermined wavelength range.

The method can stop the light source when the safety device determines the light source is sweeping at a wavelength sweep rate different from the predetermined frequency, is not sweeping in the predetermined wavelength range, or is sweeping at a wavelength outside of the predetermined wavelength range.

The safety device can include an interlock, and the method can cause the interlock to trip and optical power stays below a predetermined classification limit. The method can turn off or block the light source with the interlock. The light source can be a laser.

A storage medium storing a program according to some embodiments can cause a computer to execute a method for an apparatus, the method including generating a measurement beam with a wavelength swept light source, scanning a sample by moving the measurement beam on the sample, measuring the sample with a medical device, and causing a safety device to stop the light source based on sweeping status of the light source.

These and other objects, features, and advantages of the present disclosure will become apparent upon reading the following detailed description of exemplary embodiments of the present disclosure, when taken in conjunction with the appended drawings, and provided claims.

Further features of the present disclosure will become apparent from the following description of exemplary embodiments with reference to the attached drawings, where like structure is indicated with like reference numerals.

DESCRIPTION OF THE EMBODIMENTS

Various exemplary embodiments, features, and aspects of the disclosure that relate to safety mechanisms, devices, apparatuses, methods, and storage mediums to provide optical safety will be described below with reference to the drawings that may have different characteristics, advantages, disadvantages, performance parameters, or the like.

Some embodiments functionally implement intravascular imaging modalities including optical coherence tomography (OCT), swept source OCT (SS-OCT), optical frequency domain imaging (OFDI), Fourier domain OCT (FD-OCT), time domain OCT (TD-OCT), multi-modality OCT (MMOCT), spectrally encoded endoscopy (SEE), other imaging modalities, combinations or hybrids thereof. Arrangements can also functionally implement light detection and ranging (LiDAR) configurations that are used to measure distances to remote targets. The present disclosure is not limited to any particular configuration.

Swept source OCT is an OCT technique of acquiring the spectral distribution of the interference light by time division, and spectral domain OCT is an OCT technique of acquiring the spectral distribution of the interference light by space division.

An OCT configuration or arrangement according to some embodiments can include a wavelength swept light source, interferometer, spectrometer, scanner, optics, electronics, and can include other components or combinations thereof. A wavelength swept light source emits laser light with a continuously sweeping wavelength. The spectrometer can include microelectromechanical components (MEMS), where MEMS scanning mirrors can be used. The OCT arrangement can be an SS-OCT or another type of OCT configuration.

SS-OCT imaging is performed by splitting light emitted from a wavelength tunable light source into measurement light and reference light, superposing the return light of the measurement light returned from a sample with the reference light to generate interference light, detecting the interference light with a photodetector, and applying Fourier transform and other processes to the detected data acquired according to the wavelength sweeping and the measurement light scanning.

SS-OCT generates tunable or swept optical signal on an optical fiber that is transmitted to an interferometer. The swept optical signal scans over a scan band with a narrow-band emission.

Figure 1:
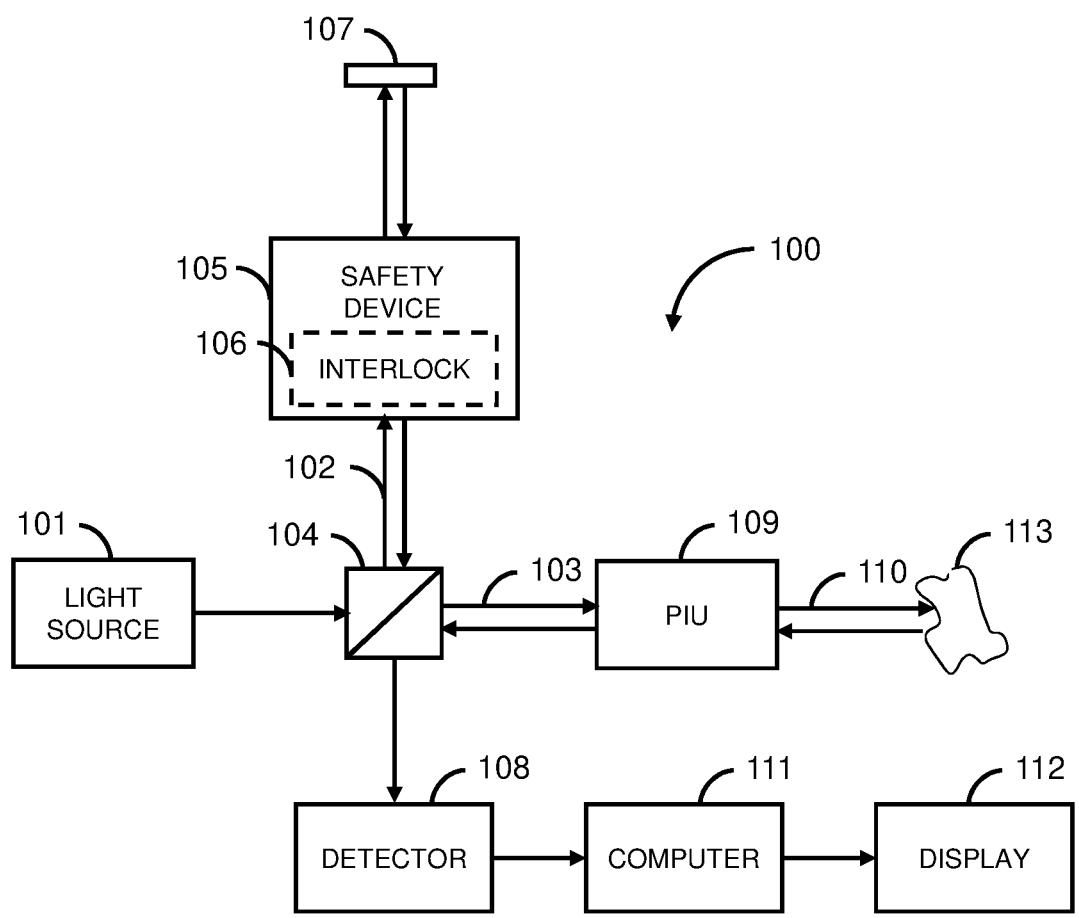
FIG. 1 is a block diagram of an SS-OCT apparatus according to some embodiments.

FIG. 1 illustrates a hardware configuration of an apparatus 100 configured as an SS-OCT according to some embodiments.

Figure 2:
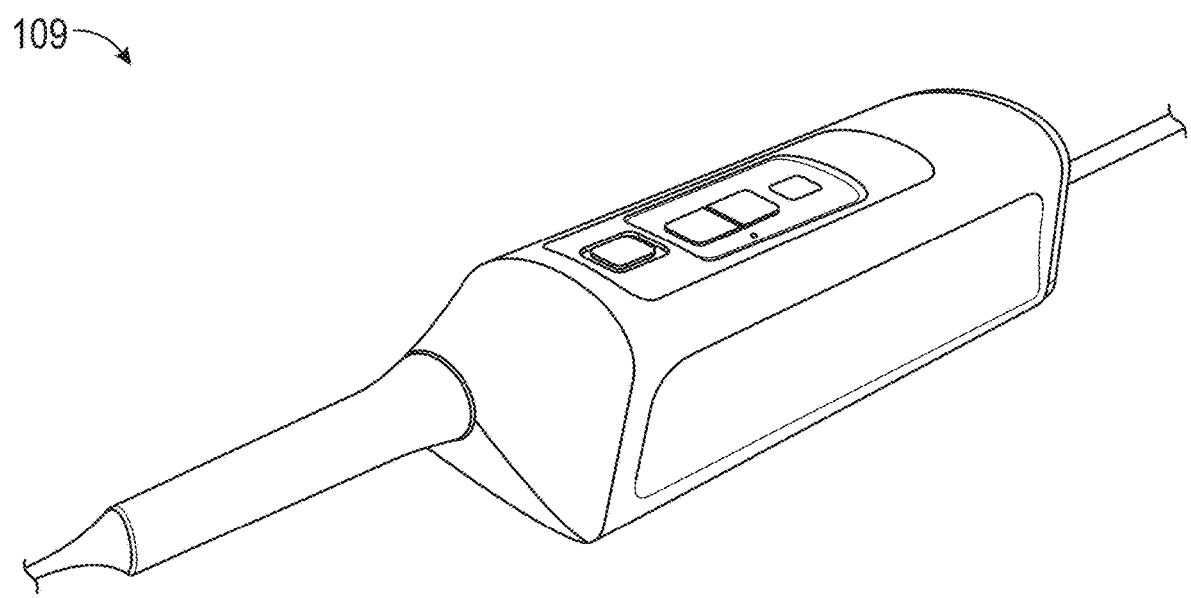
FIG. 2 illustrates a PIU according to some embodiments.

The SS-OCT apparatus 100 includes a light source 101, a reference arm 102, a sample arm 103, a beam splitter 104, a safety device 105, a reference mirror 107, a detector or measurement device 108, a patient interface unit (PIU) 109, a scanner or probe 110, a computer 111, a display 112, and can include other components or combinations thereof. The PIU 109 is shown in FIG. 2 and is configured to provide functions including imaging core rotation, imaging core translation, optical probe engage/unlock, user interface, or combinations thereof. The scanner or probe no can be an optical probe including a catheter, an endoscope, or other probe, where some together are referred to herein as an interferometer.

The apparatus 100 interacts with a sample, target, or other object 113 via the PIU 109 and the scanner no.

The light source 101 generates a measurement beam, the scanner 110 moves the measurement beam on the sample 113, the measurement device 108 measures the sample 113, and the safety device 105 can stop the light source 101 based on the sweeping status of the light source 101. The light source 101 is preferably a wavelength swept light source that emits laser light with a continuously sweeping wavelength.

The safety device 105 monitors the light source 101 and determines the sweeping status of the light source 101, wherein the light source 101 sweeps at a predetermined frequency (wavelength sweep rate) within a predetermined wavelength range.

The safety device 105 stops the light source 101 when the safety device 105 determines the light source 101 is sweeping at a wavelength sweep rate different from the predetermined frequency (for example, 100 kHz+/−0.1 kHz), is not sweeping in the predetermined wavelength range, or is sweeping at a wavelength outside of the predetermined wavelength range (for example, 1240 to 1380 nm, including +/−20 nm tolerance).

The SS-OCT apparatus 100 performs imaging based on wavelength sweeping and measurement light scanning, wherein the imaging can be performed by splitting light emitted from the light source 101 into measurement light and reference light, superposing the return light of the measurement light returned from the sample with the reference light to generate interference light, detecting data of the interference light with the detector 108, and processing the detected data acquired according to the wavelength sweeping and the measurement light scanning.

The light source 101 emits light to the beam splitter 104, which splits or divides the light from the light source 101 into a reference beam passing into the reference arm 102 and a measurement or sample beam passing through the sample arm 103. The reference beam passes through the safety device 105 and is reflected from the reference mirror 107. The sample beam passes through the PIU 109 and is emitted through the scanner (probe) 110 toward a sample, object, or target 113. Reflected light (scattered light) is received from the sample 113, and interference light with respect to the reference light is obtained. A tomographic image is generated based on the intensity of the light. The beam splitter 104 is positioned at an angle to the reference mirror 107, the detector 108, and to the sample 113. The light source 101 is preferably a wavelength swept light source that emits laser light with a continuously sweeping wavelength, and can be a laser, a white light, a broadband light, a tunable light, or other types of light.

The reference arm 102 includes the safety device 105 which connects the beam splitter 104 to the reference mirror 107.

The safety device 105 monitors the light source 101 and determines the sweeping status of the light source 101. The light source 101 sweeps at a predetermined wavelength sweep rate within a predetermined wavelength range. The safety device 105 stops the light source 101 when the safety device 105 determines the laser light source 101 is not sweeping, is sweeping at a wavelength sweep rate (frequency) different from the predetermined frequency (for example, 100 kHz+/−0.1 kHz), is not sweeping in the wavelength range (for example, 100 nm), is sweeping at a wavelength outside of the wavelength range (for example, 1240 nm to 1380 nm, including +/−20 nm tolerance), or other abnormal sweeping conditions. For example, according to some embodiments, there may be a set wavelength range that the apparatus 100 has to sweep, from 1260 nm to 1360 nm (delta=100 nm), and the frequency the apparatus 100 sweeps this wavelength range is to be at a set value of 100 kHz, for example. Of course, there is always tolerance for any number, so 100 kHz can be +/−0.1 kHz or other value, and other predetermined wavelength ranges and tolerances are within the scope of the present disclosure.

The safety device 105 can include an interlock 106, and can cause the interlock 106 to trip so optical power stays below a desired classification limit. The interlock 106 turns off or blocks the laser light source 101 by a beam shutter or other mechanism.

Longitudinal scanning is accomplished by changing the length of the reference arm 102. Longitudinal scanning provides a way of changing the location at which interference in the optical radiation is emitted off axis to the longitudinal axis of the probe 108.

The sample arm 104 includes the PIU 109 that connects the interferometer to the probe 110. The PIU 109 is shown in FIG. 2 and can include an imaging core spin motor, a linear stage, a fiber optic combiner, a graphical user interface (GUI), circuitry or a circuit board assembly, control buttons, light emitting diodes (LEDs), and can include other components or combinations thereof. The GUI is configured to provide input/output, display results, and/or other functions. The PIU 109 is configured to provide functions including imaging core rotation, imaging core translation, optical probe engage/unlock, user interface, and/or other functions.

The scanner (probe) no is an optical probe that directs the sample beam to the sample 113, where the optical probe no can be a catheter, an endoscope, or other instrument, where rotational scanning of the probe no takes place with a rotational scanning device. Samples including internal organs or tissues can be viewed by the probe no including arteries, vessels, airway, esophagus, colon, or other samples. A rotational drive can be used to rotate the probe no including a rotational motor with a rotary fiber joint.

Figure 3:
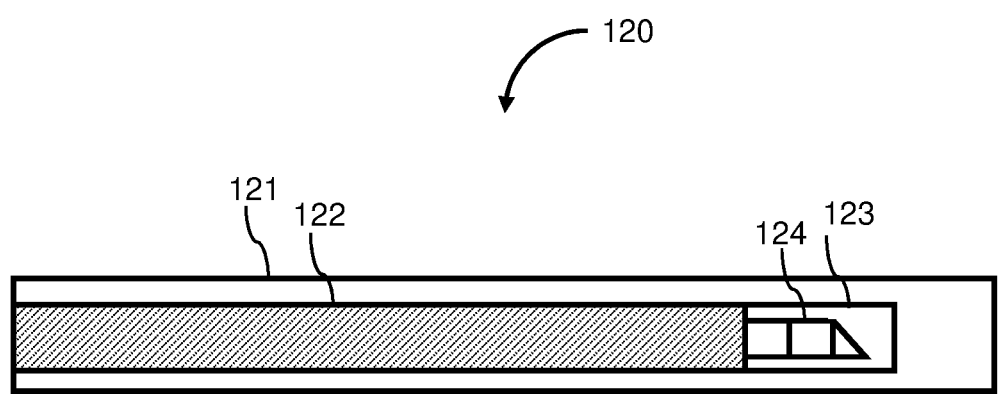
FIG. 3 illustrates a scanner (probe) configured as a catheter according to some embodiments.

FIG. 3 shows the scanner (probe) no configured as a catheter 120, where the catheter 120 includes an elongate, flexible, tubular body that is configured for intravascular placement within an internal lumen. The catheter 120 is configured to rotate for circumferential scanning and includes one or more tubular members including an outer sheath 121 and an inner sheath 122 can include other components. An illumination fiber 124 is disposed at a distal end of the inner sheath 123. A detection fiber can be disposed within the inner sheath 122. The detection fiber can be arranged within the outer sheath 121 and the outer sheath 121 is disposed around the inner sheath 122. The illumination fiber 124 and the detection fiber can be driven by one or more different motors.

The scanner (probe) 110 includes a lens for focusing which can be a gradient index (GRIN) lens, a ball lens, a spherical lens, an aspherical lens, other lenses or combinations thereof. The scanner (probe) 108 is configured as a forward-viewing or side-viewing probe. In a side-viewing probe, the incident light can be bent with respect to an optical axis of the scanner (probe) 110.

The scanner (probe) 110 includes illumination and collection optics to irradiate the sample 113 with the sample beam and collect light that is reflected from the sample 113. This reflected or scattered light is then transmitted through the sample arm 103 back to the beam splitter 104. The reference beam is reflected from the reference mirror 107 in the reference arm 102 through the safety device 105. The sample beam is reflected or scattered from the sample 113 through scanner (probe) no and the PIU 109 in the sample arm 103. The reference beam and the sample beam combine or recombine at the beam splitter 104, which generates a combined or recombined beam that has an interference pattern. An interference pattern occurs when the reference arm 102 and the sample arm 103 have the same optical length.

The recombined beams or interference patterns that are output by the interferometer are continuously acquired and detected by the detector 108. The detector 108 can be one or more photodiodes, multi-array cameras, or other types of detectors. Each detector 108 measures the interference pattern(s) between the reference arm 102 and the sample arm 103. The detector 106 generates electrical signals representative of the interference pattern(s) obtained from the output of the interferometer that are converted to digital signals to be analyzed by the computer 111 and output to the display 112 where an image of the sample is obtained and can be analyzed.

Imaging is performed through SS-OCT when the interference pattern signals are produced by different scans of wavelength when reflected at different depths using low coherence interferometry. Fourier-Domain OCT calculates the depth dependent reflection profiles. Continuously performing this A-scan at different locations creates a two-dimensional cross section.

SS-OCT can use a single longitudinal mode or a multi-longitudinal mode where the depth range in the single longitudinal mode is not restricted by the cavity length of the source. SS-OCT uses a wavelength swept laser as the light source. SS-OCT performance depends on the swept laser. SS-OCT arrangements have high imaging speed and longer imaging depth range with a single photon detector compared with other OCT arrangements. SS-OCT light sources can operate at various wavelengths including 850 nm, 1050 nm, 1310 nm, 1550 nm, or other wavelengths.

SS-OCT includes intensity-based characteristics where sweep is the optical signal generated by the laser. A sweep is defined by a monotonic increase in optical frequency from start wavelength to end wavelength which defines the sweep range $$k = 2\pi/\lambda \quad \Delta\lambda = |\lambda\text{end} - \lambda\text{start}|$$

The sweep range is the optical bandwidth of the laser and is inversely proportional to the theoretically achievable axial resolution in OCT. Generally, the larger the sweep range, the better the axial resolution. The center wavelength $\lambda_c$ is the mean of start and end wavelength. The center wavelength represents a compromise between water absorption and scattering. For longer wavelengths, scattering decreases, but water absorption becomes more dominant. There is less scattering at longer center wavelengths, but more water absorption. The center wavelength is usually not the center of gravity of the sweep with respect to power, but the mean of start and end wavelength $$\lambda_c = (\lambda_{end} + \lambda_{start})/2.$$

The wavelength can have one of two directions. If the wavelength changes from short to long wavelengths over time, the sweep is generally termed "forward sweep". If the wavelength changes from long to short wavelengths over time, the sweep is generally termed "backward sweep". Swept lasers can produce unidirectional sweeps, or alternating forward and backward sweeps, in which case the sweep is considered bidirectional. For application in OCT, the laser normally has a repetitive sweep train with a period $T_{rep}$.

For some swept laser types, there can be a dead time between the end of one sweep and the beginning of the next sweep.

OCT speed generally refers to a depth scan rate in axial scans per second or A-scans/sec with the unit of Hertz (Hz). A-scan rates have increased from a few hundred Hz to many megahertz, where OCT A-scan rates can be classified as MHz-OCT or multi-MHz-OCT. In OCT, one sweep generates a single depth profile at one sample location, the A-scan. Images are generated by stitching of those A-scans, so the OCT A-scan rate is equal to or at least directly proportional to the sweep repetition rate, which is called sweep rate $f_{sweep}=1/T_{rep}$.

The light source 101 disperses light or is incident on the sample 113 at various wavelengths. The light is within an imaging spectrum bandwidth that can be a mixture of various wavelengths in a wavelength range including infrared, ultraviolet, other ranges, and can include the entire visible spectrum. Wavelength categories, for example, can be 250-1000 nm that generally includes ultraviolet, visible, and near infrared light, 1000-3000 nm that generally includes mid-wave light, and 3000-18000 nm that generally includes thermal infrared light. OCT systems operate at different wavelengths including the infrared band within a wavelength range of 800-900 nm, the near infrared band within a wavelength range of 1250-1350 nm, or other wavelengths. The SS-OCT apparatus 100 can operate, for example, at a center wavelength of 1310 nm with a wavelength range of 100 nm (nanometer).

The safety device 105 monitors the light source 101 and determines the sweeping status of the light source 101 of the SS-OCT apparatus 100, e.g., whether the light source 101 is sweeping or not.

The light source 101 sweeps at a predetermined frequency (wavelength sweep rate) within a predetermined wavelength range. With a center wavelength of 1310 nm, for example, the light source 101 can sweep at a frequency (wavelength sweep rate) in the wavelength range of 100 nm. The safety device 105 can stop the light source 101 when the safety device 105 determines the laser light source 101 is not sweeping, is sweeping at a wavelength sweep rate (frequency) different from the predetermined frequency (for example, 100 kHz+/−0.1 kHz), is not sweeping in the predetermined wavelength range (for example, 100 nm), is sweeping at a wavelength outside of the predetermined wavelength range (for example, 1240 nm to 1380 nm, including +/−20 nm tolerance), or other abnormal sweeping conditions. For example, the light source 101 can be sweeping in an abnormal sweeping condition and is less safe in a state where the light source 101 is sweeping at a frequency lower than the predetermined wavelength range. The safety device 105 can include the interlock 106, and can cause the interlock 106 to trip so optical power stays below a desired classification limit.

The safety device 105 monitors laser operation of the SS-OCT apparatus 100 and determines whether the light source 101 is sweeping or not, or any abnormal sweeping conditions are taking place.

In a case where the safety device 105 determines laser sweeping is occurring normally, laser sweeping of the SS-OCT swept source laser continues normally to scan while the safety device 105 monitors the operation. In terms of safety, for a same sweep span to shift to a longer wavelength is acceptable. A narrower sweep span in a longer wavelength is acceptable in terms of safety. Safety is impacted in a negative way for multiple or a variety of situations where sweeping conditions are abnormal or are detrimentally affected. A same sweep span shifted to a shorter wavelength or narrower sweep span in a shorter wavelength is less safe and is not acceptable. Examples of abnormal sweeping conditions where safety may be affected in a negative or bad way occur in cases where the laser or light source is not sweeping, sweeping with a lower frequency (rate), sweeping in a narrower sweep range, sweeping in a shorter (unsafe) or longer (safe but not correct measurement) wavelength, or other possible situations.

The safety device 105 causes the laser interlock 106 to trip so optical power will stay below a desired classification limit in a case where the safety device determines the laser is sweeping in an abnormal condition including, for example, conditions where the laser light source is sweeping outside the wavelength range, is not sweeping in a predetermined operating frequency range, is sweeping at a frequency lower than the predetermined operating frequency range (less safe), or other abnormal sweeping conditions. The safety device 105 can include the interlock 106, and can cause the interlock 106 to trip so optical power stays below a desired classification limit. Monitoring and thresholding with a frequency comparator should be able to detect all of the above given appropriate thresholding.

The light source 101 can be a laser with a k-clock output whose frequency is proportional to the wavelength being output by the laser, where k=wavenumber=$2\pi$/wavelength. The k-clock can be synchronized to the light source 101 as an analog to digital (A/D) converter clock signal instead of a fixed clock. If this clock is used as a sampling clock, the A/D output is automatically linear in k-space.

The k-clock generates k-clock signals at equally spaced optical frequency sampling intervals as the swept optical signal is tuned or swept over the scan or tuning band. A swept source signal coupler can provide a portion of the swept source signal to the k-clock. The k-clock can generate a tunable or swept source optical signal on an optical fiber that is transmitted to the interferometer. The swept source optical signal scans over a scan band with a narrowband emission.

A laser generates visible and invisible light and is characterized as being monochromatic (a single wavelength), directional (has very little beam divergence), and coherent (with light waves moving in the same direction and "in phase").

Swept source lasers generate coherent radiation that sweeps over an adjustable broad optical bandwidth in infrared range at high speed. The use of optical sweep eliminates the need for mechanical scanning, thus increasing the speed and quality of imaging. The tuning bandwidth can exceed 100 nm and the sweep rate reaches 5 MHz.

In SS-OCT, reflectivity along a depth profile is measured for a multitude of wavelengths. One depth scan, or A-scan, is swept when the laser is tuned one entirely over its entire wavelength range. The SS-OCT scans the sample 113 where at least one A-scan is performed at each illumination point over the entire sample 113, with the scanner 110 moving over the sample 113. The shorter the sweep can be configured, the faster the illumination spot can be moved. For a single wavelength, the reflectivity of a sample is determined by the periodicity of the refractive index modulation along the beam. A fiber Bragg grating (FBG) can be used. A single wavelength provides information on the strength of the periodic refractive index modulation (Fourier component) along the beam with a periodicity determined by the wavevector $k=2\pi/\lambda$, where $\lambda$ is the wavelength. A depth profile can be created by a Fourier transformation of the reflectivity as a function of the wavevector.

The wavelength dependent reflectivity in the apparatus 100 is measured with the detector 106, where a narrow band light source is rapidly tuned over a large optical bandwidth.

Laser types are identified by their lasing media which determines the wavelength. Some media can produce more than one wavelength.

The laser types include solid state, gas, liquid (dye), semiconductor, free electron lasers (FELs), and can include other types or combinations thereof. The semiconductor laser, such as GaAIAs, InGaAsP, or the like, is a common type with output wavelengths ranging from around 700 nm to 1700 nm. Swept lasers using light sources including light emitting diodes (LEDs) can cover various visible and near-infrared wavelength regions from around 390 to 1,700 nm. Different semiconductor material for achieving these wavelength regions include GaN, GaAs, InP, GaAIAs, InGaAsP, and can include other semiconductor materials or combinations thereof.

Lasers are classified according to their potential to cause biological damage, and are based on various parameters including laser output or power, radiation wavelengths, exposure duration, cross-sectional area of the laser beam at the point of interest, Accessible Emission Limit (AEL), and can include other parameters or combinations thereof. The AEL is the maximum accessible level of laser radiation permitted within a particular class. Safety thresholds for lasers are expressed in terms of maximum permissible exposure (MPE). The AEL is determined as a product of the maximum permissible exposure (MPE) times an area factor called the limiting aperture (LA). The LA is dependent on laser wavelength pupil size. AEL=MPE*area of LA.

Lasers can operate in the whole optical spectrum from 180 nm to 1 mm and are classified in four general classifications where Class 1 is the safest and Class 4 is the highest class of laser radiation where output levels for continuous wave radiation start at 500 mW (milliwatts).

Figure 4:
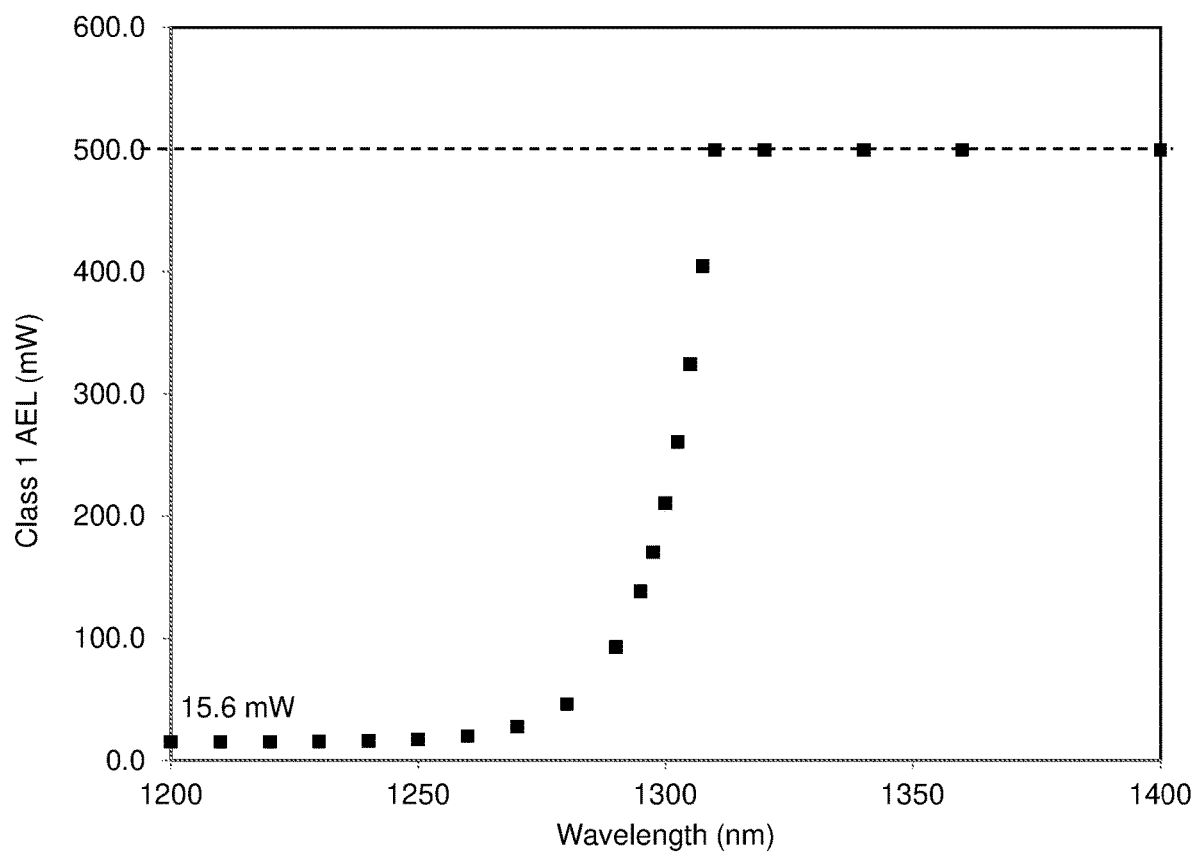
FIG. 4 is a graph illustrating the relationship between wavelength and power according to some embodiments.

FIG. 4 is a graph illustrating the relationship between wavelength and power according to some embodiments. AEL for wavelength greater than or equal to 1310 nm is 500 mW, whereas this decreases rapidly as wavelength gets shorter.

Hazards can occur with laser use including possibility of eye injury, damage to the skin, or other hazards. Effects of laser light can be based on one or more characteristic factors or attributes including the wavelength of the light, the power output, continuous wave output, pulsed wave output, direct exposure, diffuse reflection, other characteristics or combinations thereof.

When lasers fail to sweep in SS-OCT, increased ocular hazard is possible.

Imaging can be performed based on wavelength sweeping and measurement light scanning, wherein the imaging is performed by splitting light emitted from the light source into measurement light and reference light, superposing the return light of the measurement light returned from the sample with the reference light to generate interference light, detecting data of the interference light with a detector, and processing the detected data acquired according to the wavelength sweeping and the measurement light scanning.

Figure 5:
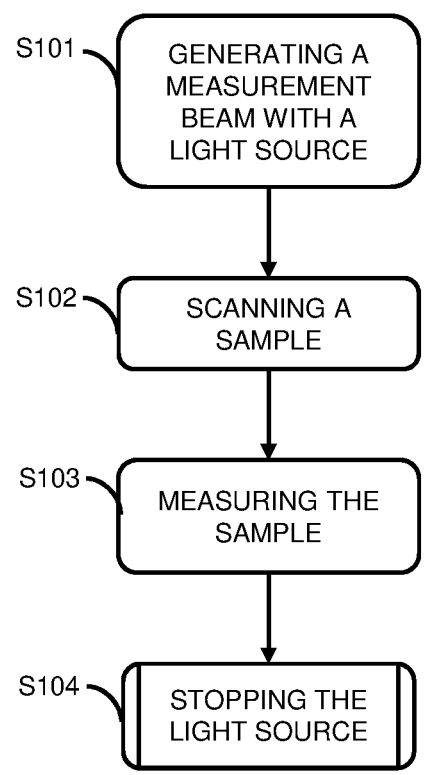
FIG. 5 is flow chart showing a method according to some embodiments.

FIG. 5 illustrates a method that the SS-OCT apparatus 100 carries out according to some embodiments. The method includes generating a measurement beam with a wavelength swept light source in step S101, scanning the sample 113 by moving the measurement beam on the sample 113 in step S102, measuring the sample 113 with a measurement device 108 in step S103, and stopping the light source 101 based on sweeping status of the light source 101 in step S104.

Figure 6:
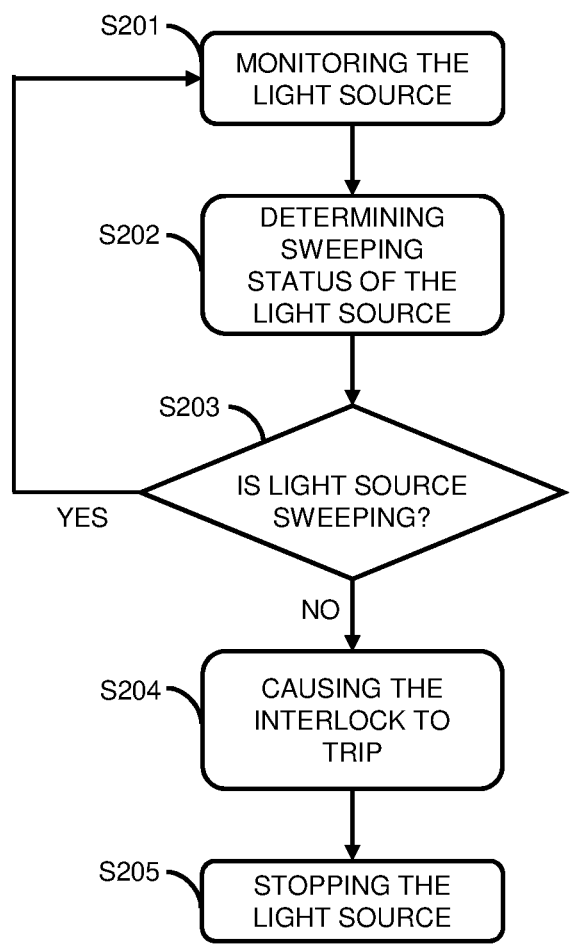
FIG. 6 is a flow chart showing a method according to some embodiments.

Details of stopping the light source 101 in the step S104 are shown in FIG. 6. The method includes monitoring the light source 101 in step S201 and determining sweeping status of the light source with the safety device 105 in step S202, wherein the light source 101 sweeps at a predetermined frequency (wavelength sweep rate) within a predetermined wavelength range. The method determines whether the light source 101 is sweeping in step S203. If the light source 101 is sweeping (light source sweeping=YES), the process returns to monitoring the light source 101 in step S201. If the light source 101 is sweeping at a wavelength sweep rate different from the predetermined frequency (for example, 100 kHz+/−0.1 kHz), is not sweeping in the predetermined wavelength range, is sweeping at a wavelength outside of the predetermined wavelength range (for example, 1240 to 1380 nm, including +/−20 nm tolerance), or other abnormal sweeping conditions (light source sweeping=NO), the method causes the interlock 105 to trip in step S204, and stops the light source 101 in step S205 by turning off or blocking the light source 101 and optical power stays below a desired classification limit.

As described above, the safety device 105 according to some embodiments provides solutions to problems of laser scan stop at a short wavelength causing an increase in laser classification and ocular hazard to the user and patient, and is configured to mitigate against laser sweep failure by monitoring laser operation and determining whether the laser light source 101 is sweeping at a wavelength sweep rate outside the wavelength range, is not sweeping in a predetermined operating frequency range, is sweeping at a frequency lower than the predetermined operating frequency range (less safe), or other abnormal sweeping conditions. The safety device 105 can cause the interlock 106 to trip so optical power stays below a desired classification limit.

Advantageous features, characteristics, and other attributes according to some of the embodiments allow for lower laser classification and safer lasers with increased output power under normal condition for imaging purposes which can lead to better penetration depth in tissue with high extinction coefficient like lipid. The ability to use laser output in some embodiments takes advantage of the laser output wavelength especially since the laser safety standard allows for higher power at the longer wavelength. Some embodiments work as risk mitigations that allow for the fast detection of laser sweep failure and trip interlock to stop emission. If the laser light source is sweeping at a wavelength sweep rate outside the wavelength range, is not sweeping in a predetermined operating frequency range, is sweeping at a frequency lower than the predetermined operating frequency range (less safe), or other abnormal sweeping conditions, then any of the safety device embodiments described herein will cause the laser interlock to trip so optical power will stay below a desired classification limit.

First Embodiment all-Electrical Option

Figure 7:
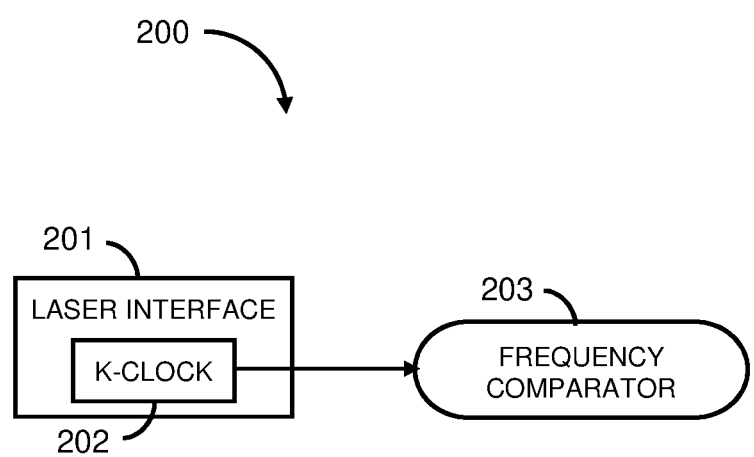
FIG. 7 illustrates a safety device according to the first embodiment.

In FIG. 7, a safety device 200 for optical safety is shown configured as an all-electrical option that includes a laser interface 201, a k-clock 202, a frequency comparator 203, and can include other components or combinations thereof according to some embodiments.

The all-electrical safety device 200 can be incorporated into and interchanged with the safety device 105 of the SS-OCT apparatus 100 of FIG. 1, where SS-OCT imaging is performed by splitting light emitted from a wavelength tunable light source into measurement light and reference light, superposing the return light of the measurement light returned from the sample with the reference light to generate interference light, detecting the interference light with a photodetector, and applying Fourier transform and other processes to the detected data acquired according to the wavelength sweeping and the measurement light scanning.

The safety device 200 is configured to mitigate against laser sweep failure by monitoring laser operation and determining whether the laser light source is sweeping at a wavelength sweep rate outside the wavelength range, is not sweeping in a predetermined operating frequency range, is sweeping at a frequency lower than the predetermined operating frequency range (less safe), or other abnormal sweeping conditions. The safety device 200 can cause the laser interlock to trip so optical power will stay below a desired classification limit. The laser interlock will automatically turn off or block the laser by a beam shutter or other mechanism.

The SS-OCT apparatus 100 according to the present embodiment includes the light source 101, the reference arm 102, the sample arm 103, the beam splitter 104, the safety device 200, the reference mirror 107, the detector 108, the PIU 109, the scanner (probe) no, the computer 111, the display 112, and can include other components and combinations thereof, where some are referred together herein as an interferometer.

The apparatus 100 interacts with the sample 113 via the PIU 109.

The light source 101 generates a measurement beam, the detector or measurement device 108 measures the measurement beam, the scanner (probe) 110 moves the measurement beam on the sample 113, and the safety device 105 can stop the light source 101 based on sweeping status of the light source 101.

The light source 101 emits light to the beam splitter 104, which splits or divides the light from the light source 101 into a reference beam passing into the reference arm 102 and a measurement or sample beam passing through the sample arm 103. The reference beam passes through the safety device 105 and is reflected from the reference mirror 107. The sample beam passes through the PIU 109 and is emitted through the probe no toward the sample 113. Reflected light (scattered light) is received from the sample 113, and interference light with respect to the reference light is obtained. A tomographic image is generated based on the intensity of the light. The beam splitter 104 is positioned at an angle to the reference mirror 107, the detector 108, and to the sample 113. The light source 101 is preferably a wavelength swept light source that emits laser light with a continuously sweeping wavelength, and can be a laser, a white light, a broadband light, a tunable light, or other types of light.

The reference arm 102 includes the safety device 200 which connects the beam splitter 104 to the reference mirror 107.

The safety device 200 monitors the light source 101 and determines sweeping status of the light source 101 of the SS-OCT apparatus 100, e.g. whether the light source 101 is sweeping or not. The light source 101 sweeps at a predetermined wavelength sweep rate within a predetermined wavelength range. With a center wavelength of 1310 nm, for example, the light source 101 can sweep at a wavelength sweep rate within the wavelength range of 100 nm.

The safety device 200 stops the light source 101 when the safety device 200 determines the laser light source 101 is not sweeping, is sweeping at a wavelength sweep rate (frequency) different from the predetermined frequency (for example, 100 kHz+/−0.1 kHz), is not sweeping in the wavelength range (for example, 100 nm), is sweeping at a wavelength outside of the wavelength range (for example, 1240 nm to 1380 nm, including +/−20 nm tolerance), or other abnormal sweeping conditions. For example, according to some embodiments, there may be a set wavelength range that the apparatus 100 has to sweep, from 1260 nm to 1360 nm (delta=100 nm), and the frequency the apparatus 100 sweeps this wavelength range is to be at a set value of 100 kHz, for example. Of course, there is always tolerance for any number, so 100 kHz can be +/−0.1 kHz or other value, and other predetermined wavelength ranges and tolerances are within the scope of the present disclosure. The safety device 200 can include the interlock 106, and can cause the interlock 106 to trip so optical power stays below a desired classification limit.

The safety device 200 monitors laser operation of the SS-OCT apparatus 100 and determines whether the light source 101 is sweeping or not, or any abnormal sweeping conditions are taking place.

In a case where the safety device 200 determines laser sweeping is occurring normally, laser sweeping of the SS-OCT swept source laser continues normally to scan while the safety device 200 monitors the operation. In terms of safety, for a same sweep span to shift to a longer wavelength is acceptable. A narrower sweep span in a longer wavelength is acceptable in terms of safety. Safety is impacted in a negative way for one or more situational conditions where sweeping becomes bad or is detrimentally affected. A same sweep span shifted to a shorter wavelength or narrower sweep span in a shorter wavelength is bad or less safe. Examples of abnormal sweeping conditions where safety may be affected in a negative or bad way occur in cases where the laser or light source is not sweeping, is sweeping with a lower frequency (rate), is sweeping in a narrower sweep range, is sweeping in a shorter (unsafe) or longer (safe but not correct measurement) wavelength, or other possible situations.

The laser interface 201 has the k-clock 202 and the safety device 200 monitors the k-clock electrical signal. The safety device 200 determines presence or absence of the k-clock signal, which is a proxy to laser sweeping status and, based on the frequency content of the signal. The frequency output of k-clocks are typically in the range of 100-500 MHz and as such a threshold lower than 100 MHz can be used. If the frequency comparator 203 detects that the output frequency is below 100 MHz, the comparator 203 can send a signal to the computer and/or laser interface 201 to shut down the laser or block the laser beam. The frequency comparator 203 can include a frequency to voltage converter and is used to make the comparison in the voltage regime. The frequency comparator 203 or one with frequency to voltage converter detects whether an input frequency or voltage is higher than or lower than some value.

The goal is not to determine the k-clock frequency but rather to determine if scanning is occurring or not. A frequency divider for the input signal at a first stage can be used to simplify the comparison. The all-electrical safety device 200 is fast and as soon as the frequency drops the interlock 106 can be tripped so optical power stays below a desired classification limit.

The safety device 200 provides solutions to problems of laser scan stop at a short wavelength causing an increase in laser classification and ocular hazard to the user and patient, and is configured to mitigate against laser sweep failure by monitoring laser operation. The laser interlock 106 trips when the laser light source 101 is sweeping at a wavelength sweep rate outside the wavelength range, is not sweeping in a predetermined operating frequency range, is sweeping at a frequency lower than the predetermined operating frequency range (less safe), or other abnormal sweeping conditions. The laser interlock 106 will automatically turn off or block the laser light source 101 by a beam shutter or other mechanism.

Second Embodiment Opto-Electrical Option

Figure 8:
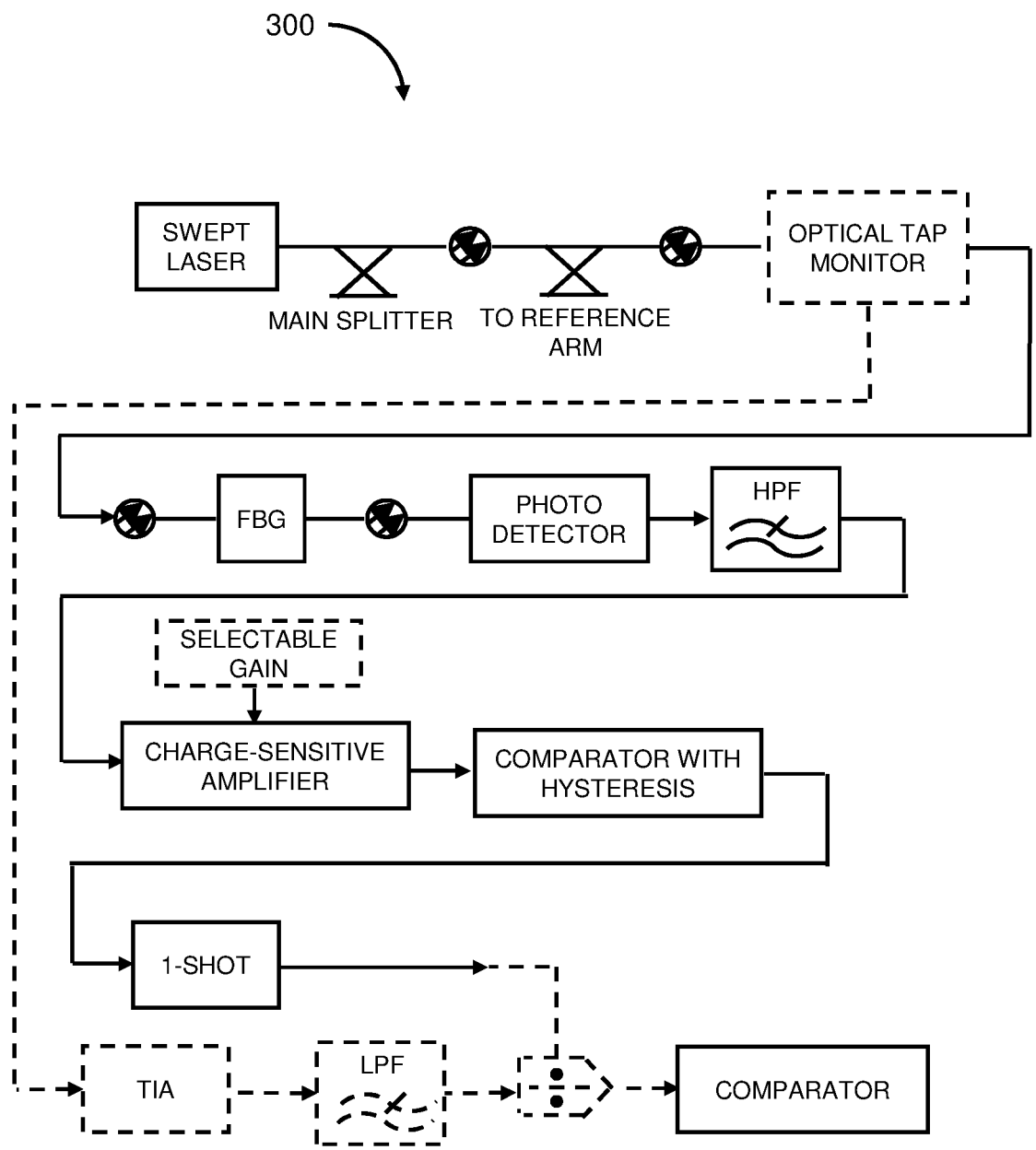
FIG. 8 illustrates a safety device according to the second embodiment.

In FIG. 8, a safety device 300 for optical safety is shown configured as an opto-electrical option that can include a tap monitor, a grating, a photo detector, a high pass filter, an amplifier with selectable gain, a comparator with hysteresis, a 1-shot trigger,] a transimpedance amplifier (TIA), a low pass filter, a comparator, and can include other components or combinations thereof according to some embodiments.

The opto-electrical safety device 300 can be incorporated into and interchanged with the safety device 105 of the SS-OCT apparatus 100 of FIG. 1, where SS-OCT imaging is performed by splitting light emitted from a wavelength tunable light source into measurement light and reference light, superposing the return light of the measurement light returned from the sample with the reference light to generate interference light, detecting the interference light with a photodetector, and applying Fourier transform and other processes to the detected data acquired according to the wavelength sweeping and the measurement light scanning.

The safety device 300 can include the interlock 106 and is configured to mitigate against laser sweep failure by monitoring laser operation and determining whether the laser light source 101 is sweeping at a wavelength sweep rate outside the wavelength range, is not sweeping in a predetermined operating frequency range, is sweeping at a frequency lower than the predetermined operating frequency range (less safe), or other abnormal sweeping conditions. The safety device 300 can cause the laser interlock 106 to trip so optical power will stay below a desired classification limit. The laser interlock 106 will automatically turn off or block the laser by a beam shutter or other mechanism.

The SS-OCT apparatus 100 according to the present embodiment includes the light source 101, the reference arm 102, the sample arm 103, the beam splitter 104, the safety device 300, the reference mirror 107, the detector 108, the PIU 109, the scanner (probe) no, the computer 111, the display 112, and can include other components and combinations thereof, where some are referred together herein as an interferometer.

The apparatus 100 interacts with the sample 113 via the PIU 109.

The light source 101 generates a measurement beam, the detector or measurement device 108 measures the measurement beam, the scanner (probe) 109 moves the measurement beam on the sample 112, and the safety device 105 can stop the light source 101 based on sweeping status of the light source 101.

The light source 101 emits light to the beam splitter 104, which splits or divides the light from the light source 101 into a reference beam passing into the reference arm 102 and a measurement or sample beam passing through the sample arm 103. The reference beam passes through the safety device 105 and is reflected from the reference mirror 107. The sample beam passes through the PIU 109 and is emitted through the probe no toward the sample 113. Reflected light (scattered light) is received from the sample 113, and interference light with respect to the reference light is obtained. A tomographic image is generated based on the intensity of the light. The beam splitter 104 is positioned at an angle to the reference mirror 107, the detector 108, and to the sample 113. The light source 101 is preferably a wavelength swept light source that emits laser light with a continuously sweeping wavelength, and can be a laser, a white light, a broadband light, a tunable light, or other types of light.

The reference arm 102 includes the safety device 300 which connects the beam splitter 104 to the reference mirror 107.

The safety device 300 can monitor the light source 101 and determine sweeping status of the light source 101 of the SS-OCT apparatus 100, e.g. whether the light source 101 is sweeping or not. The light source 101 sweeps at a wavelength sweep rate within a wavelength range. With a center wavelength of 1310 nm, for example, the light source 101 can sweep at a wavelength sweep rate with the wavelength range of 100 nm. The safety device 300 stops the light source 101 when the safety device 300 determines the laser light source 101 is not sweeping, is sweeping at a wavelength sweep rate (frequency) different from the predetermined frequency (for example, 100 kHz+/−0.1 kHz), is not sweeping in the wavelength range (for example, 100 nm), is sweeping at a wavelength outside of the wavelength range (for example, 1240 nm to 1380 nm, including +/−20 nm tolerance), or other abnormal sweeping conditions. For example, according to some embodiments, there may be a set wavelength range that the apparatus 100 has to sweep, from 1260 nm to 1360 nm (delta=100 nm), and the frequency the apparatus 100 sweeps this wavelength range is to be at a set value of 100 kHz, for example. Of course, there is always tolerance for any number, so 100 kHz can be +/−0.1 kHz or other value, and other predetermined wavelength ranges and tolerances are within the scope of the present disclosure. The safety device 300 can include the interlock 106, and can cause the interlock 106 to trip so optical power stays below a desired classification limit.

The tap monitor is an optical tap monitor integrated on a substrate that uses an optical detector to detect a small amount of light from the light source 101 to determine the output power of the light source 101. The substrate can be formed of semiconductors, dielectric materials (e.g., a glass, quartz, a crystal, etc.), metallic materials, or other materials. The detected light passes through the grating, the photo detector, the high pass filter, the amplifier, the comparator with hysteresis, the 1-shot trigger, and the comparator.

The grating can be an FBG or other grating. The photo detector can be a photo-diode to detect a signal. The high pass filter is after the FBG and the photo detector and a low pass filter is after the TIA. The amplifier can be a charge-sensitive amplifier with selectable gain, and the comparator can have hysteresis.

The safety device 300 monitors laser operation of the SS-OCT apparatus 100 and determines whether the light source 101 is sweeping or not, or any abnormal sweeping conditions are taking place.

In a case where the safety device 300 determines laser sweeping is occurring normally, laser sweeping of the SS-OCT swept source laser continues normally to scan while the safety device 300 monitors the operation. In terms of safety, for a same sweep span to shift to a longer wavelength is acceptable. A narrower sweep span in a longer wavelength is acceptable in terms of safety. Safety is impacted in a negative way for multiple or a variety of situations where sweeping becomes bad or is detrimentally affected. A same sweep span shifted to a shorter wavelength or narrower sweep span in a shorter wavelength is bad or less safe. Examples of abnormal sweeping conditions where safety may be affected in a negative or bad way occur in cases where the laser or light source is not sweeping, sweeping with a lower frequency (rate), sweeping in a narrower sweep range, sweeping in a shorter (unsafe) or longer (safe but not correct measurement) wavelength, or other possible situations.

The safety device 300 can include the interlock 106 and is configured to mitigate against laser sweep failure by monitoring laser operation and causing the laser interlock 106 to trip so optical power will stay below a desired classification limit in a case where the safety device determines the laser is sweeping in an abnormal condition including, for example, where the laser light source is sweeping at a wavelength outside the wavelength range, is not sweeping in a predetermined operating frequency range, is sweeping at a frequency lower than the predetermined operating frequency range (less safe), or other abnormal sweeping conditions. The laser interlock 106 will automatically turn off or block the laser by a beam shutter or other mechanism. Monitoring and thresholding with a frequency comparator should be able to detect all of the above given appropriate thresholding.

The opto-electrical option safety device 300 according to the present embodiment does not make use of the k-clock signal but rather relies on the optical signal from the swept laser light source 101. FIG. 8 depicts a detailed architectural description for the safety device 300. The light split to the reference arm 102 is then further split and passes through the optical tap monitor where a small fraction of the light is converted to an electrical monitor signal. The majority of the light then passes through to the FBG or another grating in transmission mode. The FBG is selected to be at a larger wavelength that is safer in terms of AEL than the average AEL for a normal sweep, preferably at a wavelength greater than 1350 nm, or greater than 1310 nm, or greater than 1280 nm. A normal sweep laser given the shape of the spectrum output could have an equivalent output wavelength in terms of laser safety equivalent to 1285 nm for example. A photo-diode then detects the signal. The electrical signal is conditioned and divided by the average signal from the optional optical tap monitor as necessary. The FBG can also be used in reflection mode when using an additional splitter or circulator. This opto-electrical option safety device 300 is fast and as soon as the frequency drops the interlock 106 can be tripped and optical power stay below desired classification limit. The laser interlock 106 will turn off or block the laser by a beam shutter or other mechanism.

Third Embodiment Opto-Electrical Option

Figure 9:
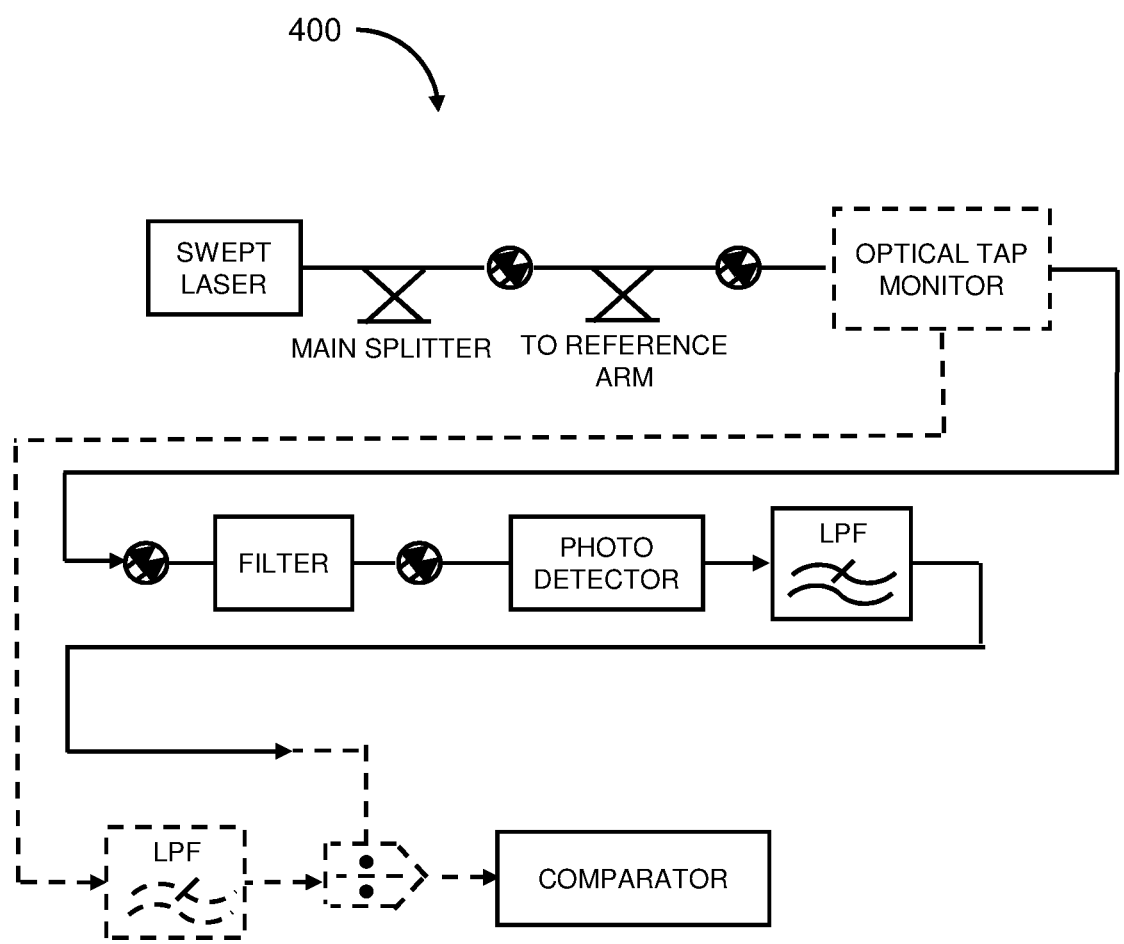
FIG. 9 illustrates a safety device according to the third embodiment.

In FIG. 9, a safety device 400 for optical safety is shown configured as an opto-electrical option that can include a tap monitor, a filter, a photo detector, one or more low pass filters, a comparator, and can include other components or combinations thereof.

The safety device 400 can be incorporated into and interchanged with the safety device 105 of the SS-OCT apparatus 100 of FIG. 1, where SS-OCT imaging is performed by splitting light emitted from a wavelength tunable light source into measurement light and reference light, superposing the return light of the measurement light returned from the sample with the reference light to generate interference light, detecting the interference light with a photodetector, and applying Fourier transform and other processes to the detected data acquired according to the wavelength sweeping and the measurement light scanning.

The safety device 400 can include the interlock 106 and is configured to mitigate against laser sweep failure by monitoring laser operation and causing the laser interlock 106 to trip so optical power will stay below a desired classification limit in a case where the safety device determines the laser light source 101 is sweeping at a wavelength outside the wavelength range, is not sweeping in a predetermined operating frequency range, is sweeping at a frequency lower than the predetermined operating frequency range (less safe), or other abnormal sweeping conditions. The laser interlock 106 will automatically turn off or block the laser by a beam shutter or other mechanism.

The SS-OCT apparatus 100 according to the present embodiment includes one or more of the light source 101, the reference arm 102, the sample arm 103, the beam splitter 104, the safety device 400, the reference mirror 107, the PIU 109, the probe 110, the detector 108, the computer 11, the display 112, and can include other components and combinations thereof, where some are referred together herein as an interferometer.

The apparatus 100 interacts with the sample 113 via the PIU 109.

The light source 101 generates a measurement beam, the detector or measurement device 108 measures the measurement beam, the scanner (probe) 109 moves the measurement beam on the sample 112, and the safety device 105 can stop the light source 101 based on sweeping status of the light source 101.

The light source 101 emits light to the beam splitter 104, which splits or divides the light from the light source 101 into a reference beam passing into the reference arm 102 and a measurement or sample beam passing through the sample arm 103. The reference beam passes through the safety device 105 and is reflected from the reference mirror 107. The sample beam passes through the PIU 109 and is emitted through the probe no toward the sample 113. Reflected light (scattered light) is received from the sample 113, and interference light with respect to the reference light is obtained. A tomographic image is generated based on the intensity of the light. The beam splitter 104 is positioned at an angle to the reference mirror 107, the detector 108, and to the sample 113. The light source 101 is preferably a wavelength swept light source that emits laser light with a continuously sweeping wavelength, and can be a laser, a white light, a broadband light, a tunable light, or other types of light.

The reference arm 102 includes the safety device 200 which connects the beam splitter 104 to the reference mirror 107.

The safety device 400 can monitor the light source 101 and determine sweeping status of the light source 101 of the SS-OCT apparatus 100, e.g. whether the light source 101 is sweeping or not. The light source 101 sweeps at a wavelength sweep rate within a wavelength range. With a center wavelength of 1310 nm, for example, the light source 101 can sweep at a wavelength sweep rate with the wavelength range of 100 nm. The safety device 400 stops the light source 101 when the safety device 300 determines the laser light source 101 is not sweeping, is sweeping at a wavelength sweep rate (frequency) different from the predetermined frequency (for example, 100 kHz+/−0.1 kHz), is not sweeping in the wavelength range (for example, 100 nm), is sweeping at a wavelength outside of the wavelength range (for example, 1240 nm to 1380 nm, including +/−20 nm tolerance), or other abnormal sweeping conditions. For example, according to some embodiments, there may be a set wavelength range that the apparatus 100 has to sweep, from 1260 nm to 1360 nm (delta=100 nm), and the frequency the apparatus 100 sweeps this wavelength range is to be at a set value of 100 kHz, for example. Of course, there is always tolerance for any number, so 100 kHz can be +/−0.1 kHz or other value, and other predetermined wavelength ranges and tolerances are within the scope of the present disclosure. The safety device 400 can include the interlock 106, and can cause the interlock 106 to trip so optical power stays below a desired classification limit.

The tap monitor is an optical tap monitor integrated on a substrate that uses an optical detector to detect a small amount of light from the light source 101 to determine the output power of the light source 101. The substrate can be formed of semiconductors, dielectric materials (e.g., a glass, quartz, a crystal, etc.), metallic materials, or other materials. The detected light passes through the filter, the photo detector, the low pass filter, and the comparator. The photo detector can be a photo-diode to detect a signal.

The safety device 400 monitors laser operation of the SS-OCT apparatus 100 and determines whether the light source 101 is sweeping or not, or any abnormal sweeping conditions are taking place.

In a case where the safety device 400 determines laser sweeping is occurring normally, laser sweeping of the SS-OCT swept source laser continues normally to scan while the safety device 400 monitors the operation. In terms of safety, for a same sweep span to shift to a longer wavelength is acceptable. A narrower sweep span in a longer wavelength is acceptable in terms of safety. Safety is impacted in a negative way for multiple or a variety of situations where sweeping becomes bad or is detrimentally affected. A same sweep span shifted to a shorter wavelength or narrower sweep span in a shorter wavelength is bad or less safe. Examples of abnormal sweeping conditions where safety may be affected in a negative or bad way occur in cases where the laser or light source is not sweeping, sweeping with a lower frequency (rate), sweeping in a narrower sweep range, sweeping in a shorter (unsafe) or longer (safe but not correct measurement) wavelength, or other possible situations.

The safety device 400 can include the interlock 106 and is configured to mitigate against laser sweep failure by monitoring laser operation and causing the laser interlock 106 to trip so optical power will stay below a desired classification limit in a case where the safety device determines the laser is sweeping in an abnormal condition including, for example, where the laser light source is sweeping outside the predetermined wavelength range, is not sweeping in a predetermined operating frequency range, is sweeping at a frequency lower than the predetermined operating frequency range (less safe), or other abnormal sweeping conditions. The laser interlock 106 will turn off or block the laser by a beam shutter or other mechanism. Monitoring and thresholding with a frequency comparator should be able to detect all of the above given appropriate thresholding.

Figure 10:
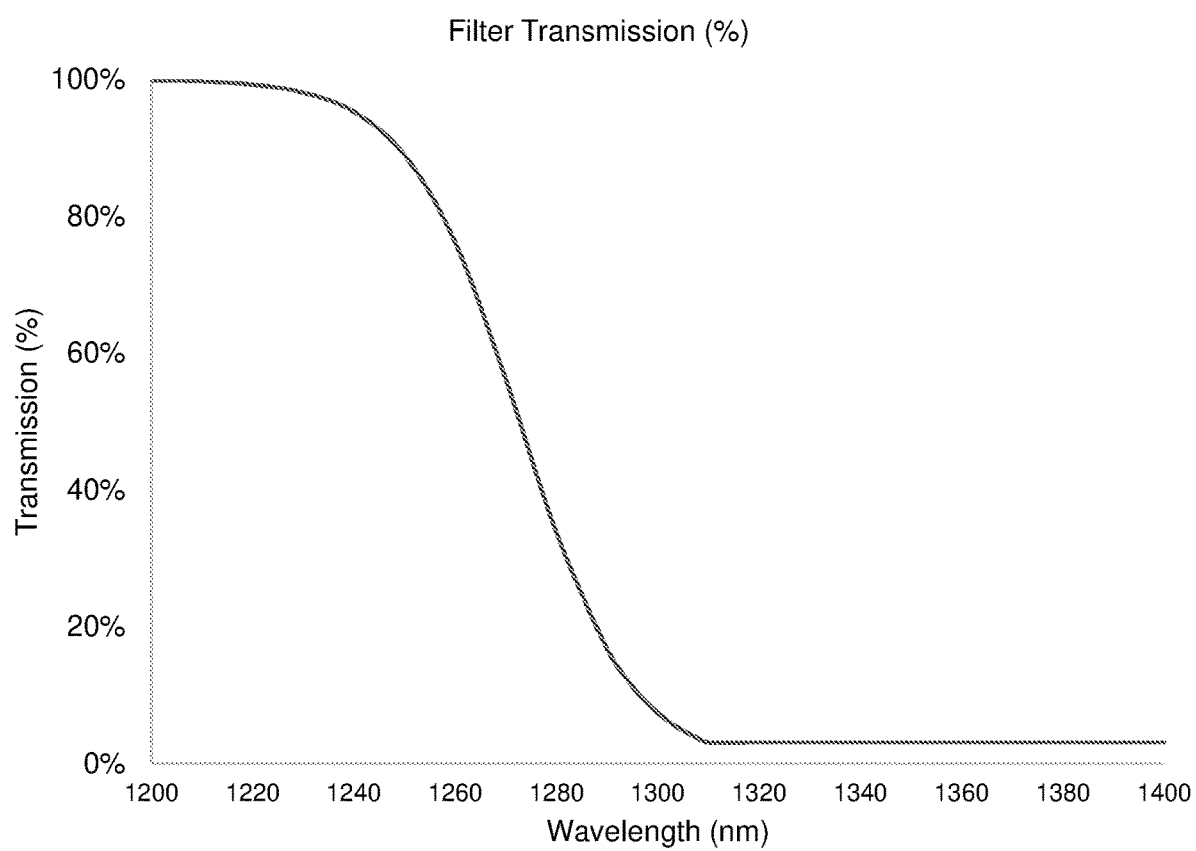
FIG. 10 illustrates filter transmission based on the safety device of the third embodiment.

The opto-electrical option safety device 400 according to the present embodiment is similar to the second embodiment where the FBG is replaced with an optical filter with transmission normalized and inversely proportional to the AEL as a function of wavelength. FIG. 10 illustrates filter transmission based on the safety device 400 of the third embodiment. Light that therefore passes through the filter is proportional to both laser wavelength and output power. The tap is used before the filter to determine if a change to laser power output occurred or if the laser is not scanning normally and is parked at a short wavelength or scanning at a shorter less safe range. The safety device 400 is fast and as soon as the output exceeds a comparator value set at an equivalent threshold for laser classification limit or one that is set a small percentage above the specific normal value for the laser when it is adequately scanning and operating under normal condition the interlock can be tripped so the OCT system can fail safe and optical power stay below desired classification limit. Low pass filtered outputs of the filter signal and tap monitor can be monitored to understand if cause of failure is due to an over-voltage condition or if it is due to a scanning malfunction.

Alternatives to the third embodiment can make use of a simplified edge filter with a mostly linear response. In yet another alternative, the filter can be a step filter with high transmission at shorter wavelengths and low transmission at longer wavelengths. The transition point can be selected at about 1290 nm for example such that if the laser parks at a low wavelength or scans erroneously in a less optically safe manner the comparator will trip the interlock Low pass filter parameters are chosen carefully to allow for sufficient smoothing of the data to account for short term fluctuations but not too much so as the response time becomes too high. For example, a 100 kHz (kilohertz) sweep rate laser can have a filter set such as it averages about 20 sweeps (0.2 ms) time lowering error due to when during the sweep the signals start while providing a total response time to shut the laser down at less than 0.25 ms (milliseconds). Laser safety standard defines the dependence of the AEL and the MPE in total energy increase as a function of time as time raised to the power 0.75 for exposure times up to 10 seconds which corresponds to a decrease in the AEL peak power limit as time to the power −0.25. Therefore, the faster the interlock delay time the higher the single fault condition power and the shorter the wavelength can be and still cause no increase on in the eye hazard level relative to the CW condition, defined by the as greater than or equal to 10 second exposure.

Determining laser classification can in the case of MMOCT for example be done by adding contribution of both the OCT laser and the second modality laser by allocating a certain portion of the AEL to each laser unit.

Figure 11:
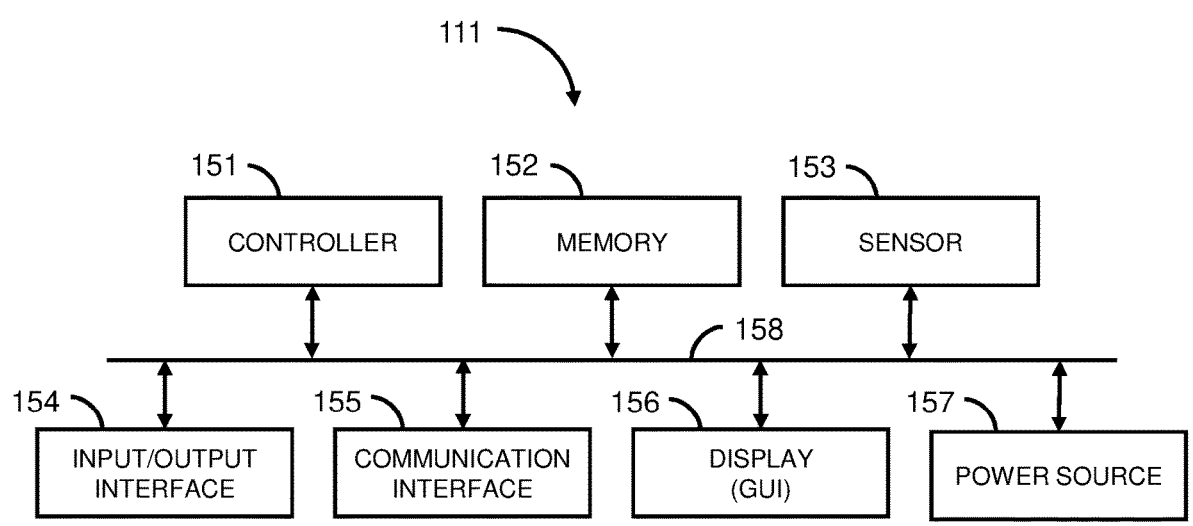
FIG. 11 is a block diagram of a computer according to some embodiments.

FIG. 11 is a block diagram of the computer 111 of FIG. 1 according to some embodiments. The computer 111 is configured to control the elements of the SS-OCT arrangements and includes one or more configurational components including a controller 151, a memory 152, a sensor 153, an input and output (I/O) interface 154, a communication interface 155, a display 156, and can include other elements. The controller 151 includes one or more processors, circuitry, or combinations thereof, and is configured as a control circuit or circuitry for performing overall control of the SS OCT apparatus 100 and components connected to the SS-OCT apparatus 100. The SS-OCT apparatus 100 can be interconnected with medical instruments or other devices, and can be controlled independently, externally, or remotely by the controller 151.

The memory 152 is used as a work memory. The memory 152 stores software or computer instructions, and can save various types of data such as OCT images, other image configurations, or the like. The memory 152 may be configured as a hard disk drive (HDD), a solid-state drive (SSD), or the like. The controller 151 executes the software developed in the memory 152 to execute the processing of the SS-OCT apparatus 100 and components connected to the SS-OCT apparatus 100, and various parameters for use in image processing. The I/O interface 154 inputs information from the SS-OCT apparatus 100 to the controller 151 and outputs information for displaying to the display 156.

The communication interface 155 may be configured as a circuit or other device for communicating with components included the apparatus 100, and with various external apparatuses connected to the apparatus via a network. For example, the communication interface 155 may store information to be output in a transfer packet and output the transfer packet to an external apparatus via the network by communication technology such as Transmission Control Protocol/Internet Protocol (TCP/IP). The apparatus may include a plurality of communication circuits according to a desired communication form.

The controller 151 can be communicatively interconnected or interfaced with one or more external devices including, for example, one or more data storages, one or more external user input/output devices, or the like. The controller 151 can interface with other elements including, for example, one or more of an external storage, a keyboard, a mouse, a sensor, a microphone, a speaker, a projector, a scanner, an illumination device, or the like.

The display 156 is a display device configured, for example, as a monitor, an LCD (liquid panel display), an LED display, an OLED (organic LED) display, a plasma display, an organic electro luminescence panel, or the like. Based on the control of the apparatus 100, a screen may be displayed on the display 156 showing one or more images being captured, captured images, captured moving images recorded, data or other information on the memory 152, or the like.

The components are connected together by a bus 158 so that the components can communicate with each other. The bus 158 transmits and receives data between these pieces of hardware connected together, or transmits a command from the controller 151 to the other pieces of hardware. The components can be implemented by one or more physical devices that may be coupled to the controller 151 through a communication channel. For example, the controller 151 can be implemented using circuitry in the form of ASIC (application specific integrated circuits) or the like. Alternatively, the controller 151 can be implemented as a combination of hardware and software, where the software is loaded into a processor from a memory or over a network connection. Functionality of the controller 151 can be stored on a storage medium, which may include RAM (random-access memory), ROM (read only memory), magnetic or optical drive, diskette, cloud storage, or the like.

As described above, the safety device 105 provides solutions to problems of laser scan stop at a short wavelength causing an increase in laser classification and ocular hazard to the user and patient, and is configured to mitigate against laser sweep failure by monitoring laser operation and determining whether the laser light source 101 is sweeping outside the wavelength range, is not sweeping in a predetermined operating frequency range, is sweeping at a frequency lower than the predetermined operating frequency range (less safe), or other abnormal sweeping conditions. The safety device 105 can include the laser interlock 106, and can cause the interlock 106 to trip so optical power will stay below a desired classification limit. The laser interlock 106 will turn off or block the laser by a beam shutter or other mechanism.

An apparatus according to some embodiments includes a wavelength swept light source to generate a measurement beam, a scanner to move the measurement beam on a sample, a measurement device to measure the sample, and a safety device to stop the light source based on sweeping status of the light source.

The safety device monitors the light source and determines the sweeping status of the light source with the safety device, wherein the light source sweeps at a predetermined frequency (wavelength sweep rate) within a predetermined wavelength range.

The safety device can stop the light source when the safety device determines the light source is sweeping at a wavelength sweep rate different from the predetermined frequency, is not sweeping in the predetermined wavelength range, is sweeping at a wavelength outside of the predetermined wavelength range, or other abnormal conditions.

The safety device can include an interlock, and the safety device can cause the interlock to trip and optical power stays below a predetermined classification limit. The interlock can turn off or block the light source.

The safety device can include a k-clock and a comparator to make a comparison in a voltage regime or a frequency regime.

The safety device can include a tap monitor, a fiber Bragg grating, and a comparator to make a comparison in a voltage regime or a frequency regime. The safety device can include a tap monitor and an optical filter and a comparator to make a comparison in a voltage regime or a frequency regime.

The light source can be a laser. The apparatus can include an OCT apparatus that performs imaging based on wavelength sweeping and measurement light scanning.

The imaging can be performed by splitting light emitted from the light source into measurement light and reference light, superposing the return light of the measurement light returned from the sample with the reference light to generate interference light, detecting data of the interference light with a detector, and processing the detected data acquired according to the wavelength sweeping and the measurement light scanning.

The OCT apparatus can include a reference arm, a sample arm, a beam splitter, a reference mirror, a detector, a PIU, a probe, a computer, a display, or combinations thereof.

The PIU can be configured to provide functions including imaging core rotation, imaging core translation, optical probe engage/unlock, user interface, or combinations thereof. The probe can include an optical probe and be a catheter or an endoscope.

A method for an apparatus according to some embodiments includes generating a measurement beam with a wavelength swept light source, scanning a sample by moving the measurement beam on the sample, measuring the sample with a measurement device, and causing a safety device to stop the light source based on sweeping status of the light source.

The method can monitor the light source and determine the sweeping status of the light source with the safety device, wherein the light source sweeps at a predetermined frequency (wavelength sweep rate) within a predetermined wavelength range.

The method can stop the light source when the safety device determines the light source is sweeping at a wavelength sweep rate different from the predetermined frequency, is not sweeping in the predetermined wavelength range, is sweeping at a wavelength outside of the predetermined wavelength range, or other abnormal conditions.

A storage medium storing a program according to some embodiments can cause a computer to execute a method for an apparatus, the method including generating a measurement beam with a wavelength swept light source, scanning a sample by moving the measurement beam on the sample, measuring the sample with a medical device, and causing a safety device to stop the light source based on sweeping status of the light source.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard-disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An apparatus comprising:
    a flexible member having a hollow cavity extending between a proximal end and a distal end;
    a wavelength swept light source to generate a measurement beam;
    a scanner to move the measurement beam on a sample;
    a measurement device to measure the sample; and
    a safety device to stop the light source based on sweeping status of the light source,
    wherein the safety device monitors the light source and determines the sweeping status of the light source with the safety device, wherein the light source sweeps at a predetermined frequency (wavelength sweep rate) within a predetermined wavelength range.

2. The apparatus according to claim 1, wherein the safety device stops the light source when the safety device determines the light source is sweeping at a wavelength sweep rate different from the predetermined frequency, is not sweeping in the predetermined wavelength range, or is sweeping at a wavelength outside of the predetermined wavelength range.

3. The apparatus according to claim 1, wherein the safety device comprises an interlock.

4. The apparatus according to claim 3, wherein the safety device causes the interlock to trip and optical power stays below a predetermined classification limit.

5. The apparatus according to claim 3, wherein the interlock turns off or blocks the light source.

6. The apparatus according to claim 1, wherein the light source comprises a laser.

7. The apparatus according to claim 1, wherein the safety device comprises a k-clock and a comparator to make a comparison in a voltage regime or a frequency regime.

8. The apparatus according to claim 1, wherein the safety device comprises a tap monitor, a fiber Bragg grating, and a comparator to make a comparison in a voltage regime or a frequency regime.

9. The apparatus according to claim 1, wherein the safety device comprises a tap monitor and an optical filter and a comparator to make a comparison in a voltage regime or a frequency regime.

10. The apparatus according to claim 1, wherein the apparatus comprises an optical coherence tomography (OCT) apparatus that performs imaging based on wavelength sweeping and measurement light scanning.

11. The apparatus according to claim 10, wherein the imaging is performed by splitting light emitted from the light source into measurement light and reference light, superposing the return light of the measurement light returned from the sample with the reference light to generate interference light, detecting data of the interference light with a detector, and processing the detected data acquired according to the wavelength sweeping and the measurement light scanning.

12. The apparatus according to claim 10, wherein the OCT apparatus comprises a reference arm, a sample arm, a beam splitter, a reference mirror, a detector, a patient interface unit (PIU), a probe, a computer, a display, or combinations thereof.

13. The apparatus according to claim 12, wherein the PIU is configured to provide functions including imaging core rotation, imaging core translation, optical probe engage/unlock, user interface, or combinations thereof.

14. The apparatus according to claim 12, wherein the probe comprises an optical probe and is a catheter or an endoscope.

15. A method for an apparatus comprising:
generating a measurement beam with a wavelength swept light source;
scanning a sample by moving the measurement beam on the sample;
measuring the sample with a measurement device; and
causing a safety device to stop the light source based on sweeping status of the light source; and
monitoring the light source and determining the sweeping status of the light source with the safety device, wherein the light source sweeps at a predetermined frequency (wavelength sweep rate) within a predetermined wavelength range.

16. The method according to claim 15, further comprising stopping the light source when the safety device determines the light source is sweeping at a wavelength sweep rate different from the predetermined frequency, is not sweeping in the predetermined wavelength range, or is sweeping at a wavelength outside of the predetermined wavelength range.

17. The method according to claim 15, wherein the safety device comprises an interlock.

18. The method according to claim 15, further comprising causing the interlock to trip and optical power stays below a predetermined classification limit.

19. The method according to claim 15, further comprising turning off or blocking the light source with the interlock.

20. The method according to claim 15, wherein the light source comprises a laser.

21. The method according to claim 15, wherein the safety device comprises a k-clock and a comparator to make a comparison in a voltage regime or a frequency regime.

22. The method according to claim 15, wherein the safety device comprises a tap monitor, a fiber Bragg grating, and a comparator to make a comparison in a voltage regime or a frequency regime.

23. The method according to claim 15, wherein the safety device comprises a tap monitor, an optical filter, and a comparator to make a comparison in a voltage regime or a frequency regime.

24. The method according to claim 15, wherein the apparatus comprises an optical coherence tomography (OCT) apparatus that performs imaging based on wavelength sweeping and measurement light scanning.

25. The method according to claim 24, wherein the imaging is performed by splitting light emitted from the light source into measurement light and reference light, superposing the return light of the measurement light returned from the sample with the reference light to generate interference light, detecting data of the interference light with a detector, and processing the detected data acquired according to the wavelength sweeping and the measurement light scanning.

26. The method according to claim 24, wherein the OCT apparatus comprises a reference arm, a sample arm, a beam splitter, a reference mirror, a detector, a patient interface unit (PIU), a probe, a computer, a display, or combinations thereof.

27. The method according to claim 26, wherein the PIU is configured to provide functions including imaging core rotation, imaging core translation, optical probe engage/unlock, user interface, or combinations thereof.

28. The method according to claim 26, wherein the probe comprises an optical probe and is a catheter or an endoscope.

29. A storage medium storing a program for causing a computer to execute a method for an apparatus, the method comprising:
generating a measurement beam with a wavelength swept light source;
scanning a sample by moving the measurement beam on the sample;
measuring the sample with a measurement device; and
causing a safety device to stop the light source based on sweeping status of the light source; and
monitoring the light source and determining the sweeping status of the light source with the safety device, wherein the light source sweeps at a predetermined frequency (wavelength sweep rate) within a predetermined wavelength range.

* * * * *